(12) United States Patent
Harshith Katta Rajasekhar

(10) Patent No.: US 12,445,515 B2
(45) Date of Patent: *Oct. 14, 2025

(54) ACCESSING FILES FROM VIRTUAL DESKTOPS AND APPLICATIONS DURING INTERRUPTIONS TO CONNECTIVITY

(71) Applicant: Citrix Systems, Inc., Fort Lauderdale, FL (US)

(72) Inventor: Sreenivas Harshith Katta Rajasekhar, Hindupur (IN)

( * ) Notice: Subject to any disclaimer, the term of this patent is extended or adjusted under 35 U.S.C. 154(b) by 48 days.

This patent is subject to a terminal disclaimer.

(21) Appl. No.: 18/337,740

(22) Filed: Jun. 20, 2023

(65) Prior Publication Data

US 2023/0353629 A1 Nov. 2, 2023

Related U.S. Application Data

(63) Continuation of application No. 17/557,746, filed on Dec. 21, 2021, now Pat. No. 11,722,552.

(51) Int. Cl.
*H04L 67/06* (2022.01)
*G06F 9/455* (2018.01)
*H04L 67/01* (2022.01)
*H04L 67/1097* (2022.01)

(52) U.S. Cl.
CPC .......... *H04L 67/06* (2013.01); *G06F 9/45558* (2013.01); *H04L 67/01* (2022.05); *H04L 67/1097* (2013.01); *G06F 2009/45595* (2013.01)

(58) Field of Classification Search
CPC ..... H04L 67/06; H04L 67/01; H04L 67/1097; G06F 9/45558
USPC ......................................... 709/217, 219, 226
See application file for complete search history.

(56) References Cited

U.S. PATENT DOCUMENTS

| | | | |
|---|---|---|---|
| 9,098,357 B2 * | 8/2015 | Uola ...................... | G06F 9/542 |
| 10,204,704 B1 * | 2/2019 | Wurst .................... | G16H 10/20 |
| 2014/0304230 A1 * | 10/2014 | Simon .................... | G06F 16/27 |
| | | | 707/634 |
| 2014/0330669 A1 * | 11/2014 | Bruce ................. | G06Q 30/0631 |
| | | | 705/26.7 |
| 2017/0264525 A1 * | 9/2017 | Falk ..................... | G06F 11/1482 |
| 2018/0041567 A1 * | 2/2018 | Kidambi ................. | H04L 67/63 |
| 2022/0191288 A1 * | 6/2022 | Harshith ............... | H04L 67/141 |

\* cited by examiner

*Primary Examiner* — Liang Che A Wang

(57) ABSTRACT

Described embodiments provide systems and methods of providing accessing to a file. A client device may store a copy of a file. The copy may be generated during active use of the file in which content of the file is accessible by the client device via an application hosted on a remote computing device. Responsive to a loss in connectivity that disrupts the active use of the file, the client device may identify a local application on the client device based at least on a type of the file. The client device may use the identified local application to access the copy of the file stored on the client device and continue the active use of content of the file. Subsequent to restoring the connectivity, the client device may provide the file to the remote computing device for synchronization of the file.

16 Claims, 12 Drawing Sheets ns to connectivity between computing devices to enable continued active use of the file on one of the devices. A client device may store a copy of a file. The copy may be generated during active use of the file in which content of the file is accessible by the client device via an application hosted on a remote computing device. Responsive to a loss in connectivity that disrupts the active use of the file, the client device may identify a local application on the client device based at least on a type of the file. The client device may use the identified local application to access the copy of the file stored on the client device and continue the active use of content of the file.
ACCESSING FILES FROM VIRTUAL DESKTOPS AND APPLICATIONS DURING INTERRUPTIONS TO CONNECTIVITY

RELATED APPLICATIONS

This application is a CONTINUATION application of U.S. patent application Ser. No. 17/557,746 (filed Dec. 21, 2021), which is incorporated here by reference in its entirety.

FIELD OF THE DISCLOSURE

The present application generally relates to computing systems. In particular, the present application relates to systems and methods for continued file use upon loss of connectivity between remote computing devices.

BACKGROUND

An enterprise service may host various resources to be accessed by a client. To access such resources, the client may rely on a network connection with the enterprise service.

BRIEF SUMMARY

Aspects of the present disclosure are directed to systems and methods for accessing files during interruptions to connectivity between computing devices to enable continued active use of the file on one of the devices. A client device may store a copy of a file. The copy may be generated during active use of the file in which content of the file is accessible by the client device via an application hosted on a remote computing device. Responsive to a loss in connectivity that disrupts the active use of the file, the client device may identify a local application on the client device based at least on a type of the file. The client device may use the identified local application to access the copy of the file stored on the client device and continue the active use of content of the file.

In some embodiments, the client device may receive, responsive to re-establishing connectivity with the remote computing device, a request to provide the copy of the file accessed at the client device during the disruption to the remote computing device. In some embodiments, the client device may, responsive to determining that the file was accessed during the disruption; the copy of the file to synchronize with a second copy of the file maintained by the remote computing device.

In some embodiments, the client device may, responsive to a rejection of a prompt to continue accessing of the file using the local application, maintain the file in a cache of the client device. In some embodiments, the client device may encrypt the file to restrict access to the file from outside the application and the local application.

In some embodiments, the client device may invoke the local application to access the file, responsive to a selection of the local application on the client device. In some embodiments, the client device may establish a session with the remote computing device to provide a virtual desktop via which the client device is to access the file using the remote application.

Aspects of the present disclosure are directed to systems and methods for synchronizing files accessed during interruptions to connectivity. A remote computing device may provide a file to a client device to store a copy of the file during an active use of the file in which content of the file is accessible by the client device via an application hosted on the remote computing device. The remote computing device may identify a loss in connectivity to the client disrupting the active use of the file via the application. The remote computing device may receive, responsive to the client device re-establishing the connectivity with the remote computing device subsequent to the disruption, the copy of the file accessed by the client device using a local application that is identified based at least on the type of the file.

In some embodiments, the remote computing device may synchronize a second copy of the file maintained by the remote computing device with the copy of the file accessed using the local application, subsequent to the disruption. In some embodiments, the client device may store an encrypted copy of the file to restrict access to the file from outside the application and the local application.

In some embodiments, the remote computing device may provide a virtual desktop via which the client device is to access the file using the remote application. In some embodiments, the remote computing device may receive the file accessed using the local application invoked on the client device, responsive to a selection of the local application on the client device identified as configured to access the file.

In some embodiments, the remote computing device may receive the file from the client device, responsive to determining that the file was accessed at the client device during the disruption. In some embodiments, the remote computing device may monitor the active use of a plurality of files by the client device via the application hosted on the remote computing device.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
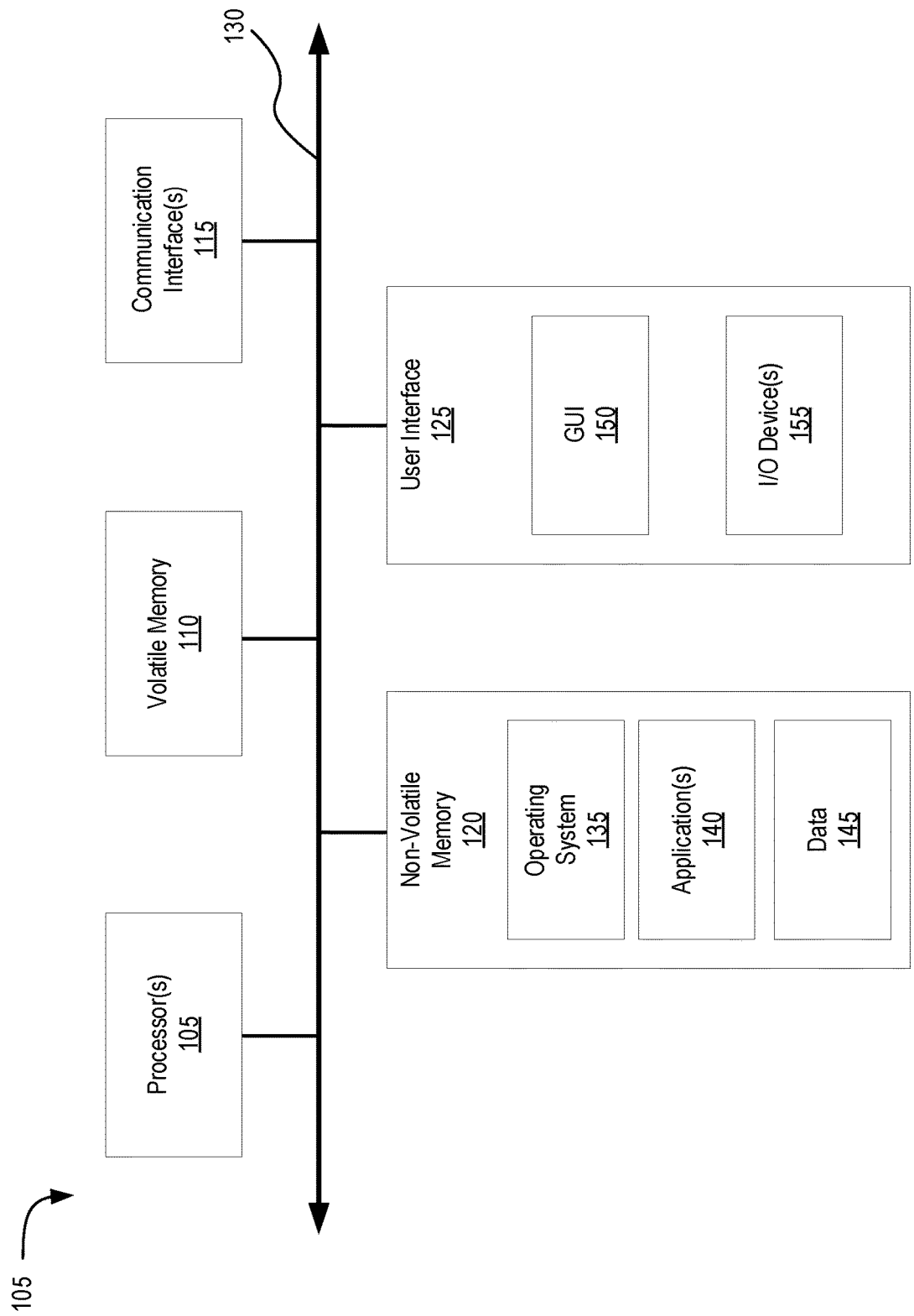
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes systems and methods for providing virtualized application delivery controllers; and Section C describes systems and methods for accessing files during interruptions to connectivity.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital, or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
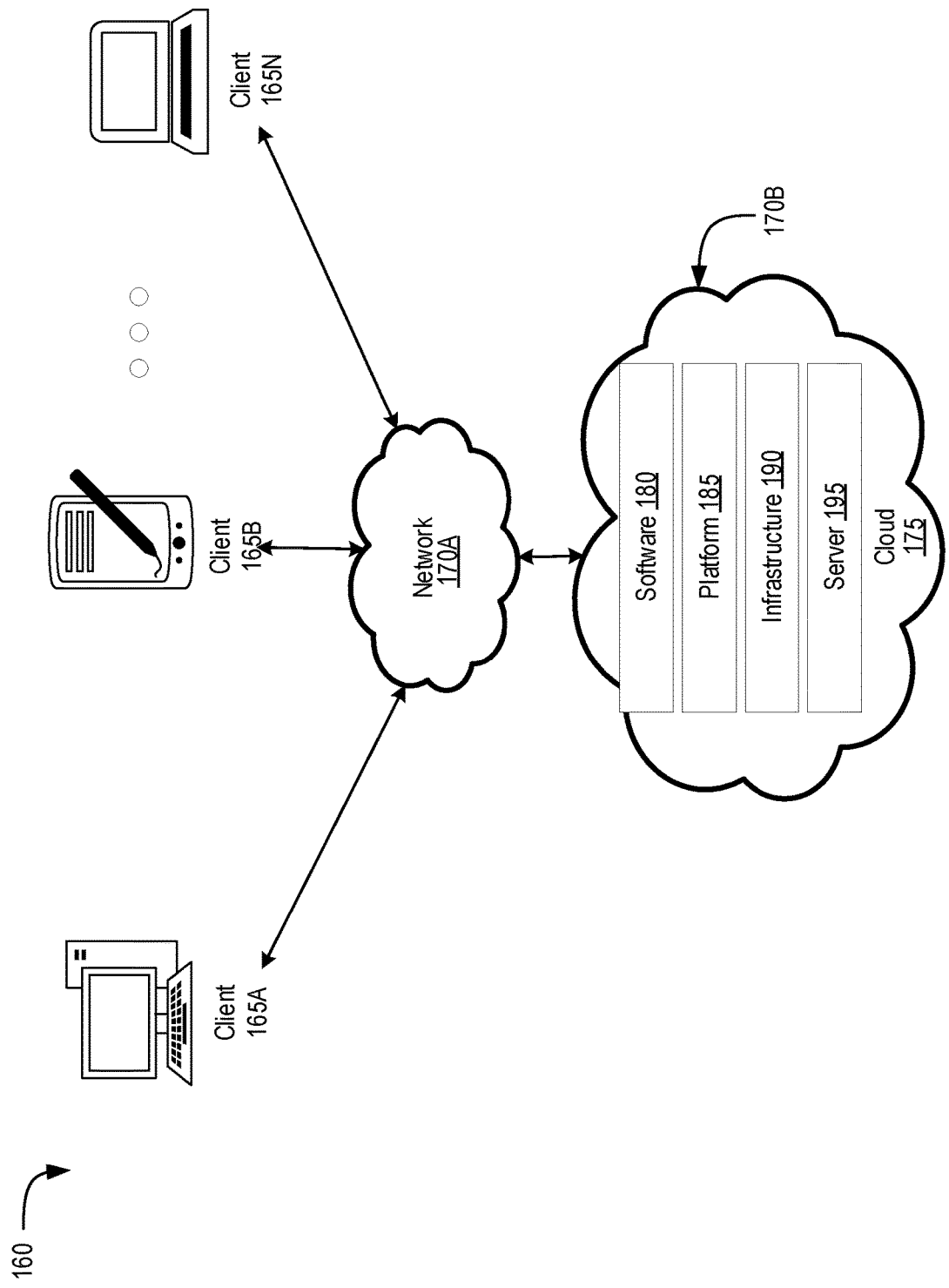
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing, or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 160 may provide clients 165 with one or more resources provided by a network environment. The computing environment 160 may include one or more clients 165A-165N, in communication with a cloud 175 over one or more networks 170. Clients 165 may include, e.g., thick clients, thin clients, and zero clients. The cloud 175 may include back end platforms, e.g., servers, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In some embodiments, the computing environment 160 can include a hybrid cloud that is a combination of a public cloud and a private cloud; i.e., the cloud 175 may be public, private, or hybrid. Public clouds 175 may include public servers that are maintained by third-parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back end platforms, e.g., servers, storage, server farms, or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control, and/or generate reports corresponding to the provided shared services and resources.

In some embodiments, the computing environment 160 can include and provide different types of cloud computing services. For example, the computing environment 160 can include Infrastructure as a Service (IaaS). The computing environment 160 can include Platform as a Service (PaaS). The computing environment 160 can include server-less computing. The computing environment 160 can include SaaS. For example, the cloud 175 may also include a cloud based delivery, e.g., SaaS 180, PaaS 185, and IaaS 190. IaaS may refer to a user renting the use of infrastructure resources that are needed during a specified time period. IaaS providers may offer storage, networking, servers, or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc., of Mountain View, California, or RIGHTSCALE provided by RightScale, Inc., of Santa Barbara, California. PaaS providers may offer functionality provided by IaaS, including, e.g., storage, networking, servers, or virtualization, as well as additional resources such as the operating system, middleware, or runtime resources. Examples of PaaS include WINDOWS AZURE provided by Microsoft Corporation of Redmond, Washington, Google App Engine provided by Google Inc., and HEROKU provided by Heroku, Inc., of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc., of San Francisco, California, or OFFICE 365 provided by Microsoft Corporation. Examples of SaaS may also include data storage providers, e.g., DROPBOX provided by Dropbox, Inc., of San Francisco, California, Microsoft SKYDRIVE provided by Microsoft Corporation, Google Drive provided by Google Inc., or Apple ICLOUD provided by Apple Inc., of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g., GOOGLE CHROME, Microsoft EDGE?, or Mozilla Firefox provided by Mozilla Foundation of Mountain View, California). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Systems and Methods for Providing Virtualized Application Delivery Controller Referring now to FIG. 2, a block diagram of a virtualized environment 200 is shown. As shown, a computing device 202 in virtualized environment 200 includes a virtualization layer 203, a hypervisor layer 204, and a hardware layer 207. Hypervisor layer 204 includes one or more hypervisors (or virtualization managers) 201 that allocates and manages access to a number of physical resources in hardware layer 207 (e.g., physical processor(s) 221 and physical disk(s) 228) by at least one virtual machine (VM) (e.g., one of VMs 206) executing in virtualization layer 203. Each VM 206 may include allocated virtual resources such as virtual processors 232 and/or virtual disks 242, as well as virtual resources such as virtual memory and virtual network interfaces. In some embodiments, at least one of VMs 206 may include a control operating system (e.g., 205) in communication with hypervisor 201 and used to execute applications for managing and configuring other VMs (e.g., guest operating systems 210) on device 202.

In general, hypervisor(s) 201 may provide virtual resources to an operating system of VMs 206 in any manner that simulates the operating system having access to a physical device. Thus, hypervisor(s) 201 may be used to emulate virtual hardware, partition physical hardware, virtualize physical hardware, and execute virtual machines that provide access to computing environments. In an illustrative embodiment, hypervisor(s) 201 may be implemented as a XEN hypervisor, for example as provided by the open source Xen.org community. In an illustrative embodiment, device 202 executing a hypervisor that creates a virtual machine platform on which guest operating systems may execute is referred to as a host server. In such an embodiment, device 202 may be implemented as a XEN server as provided by Citrix Systems, Inc., of Fort Lauderdale, FL.

Hypervisor 201 may create one or more VMs 206 in which an operating system (e.g., control operating system 205 and/or guest operating system 210) executes. For example, the hypervisor 201 loads a virtual machine image to create VMs 206 to execute an operating system. Hypervisor 201 may present VMs 206 with an abstraction of hardware layer 207, and/or may control how physical capabilities of hardware layer 207 are presented to VMs 206. For example, hypervisor(s) 201 may manage a pool of resources distributed across multiple physical computing devices.

In some embodiments, one of VMs 206 (e.g., the VM executing control operating system 205) may manage and configure other of VMs 206, for example by managing the execution and/or termination of a VM and/or managing allocation of virtual resources to a VM. In various embodiments, VMs may communicate with hypervisor(s) 201 and/or other VMs via, for example, one or more Application Programming Interfaces (APIs), shared memory, and/or other techniques.

In general, VMs 206 may provide a user of device 202 with access to resources within virtualized computing environment 200, for example, one or more programs, applications, documents, files, desktop and/or computing environments, or other resources. In some embodiments, VMs 206 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 2:
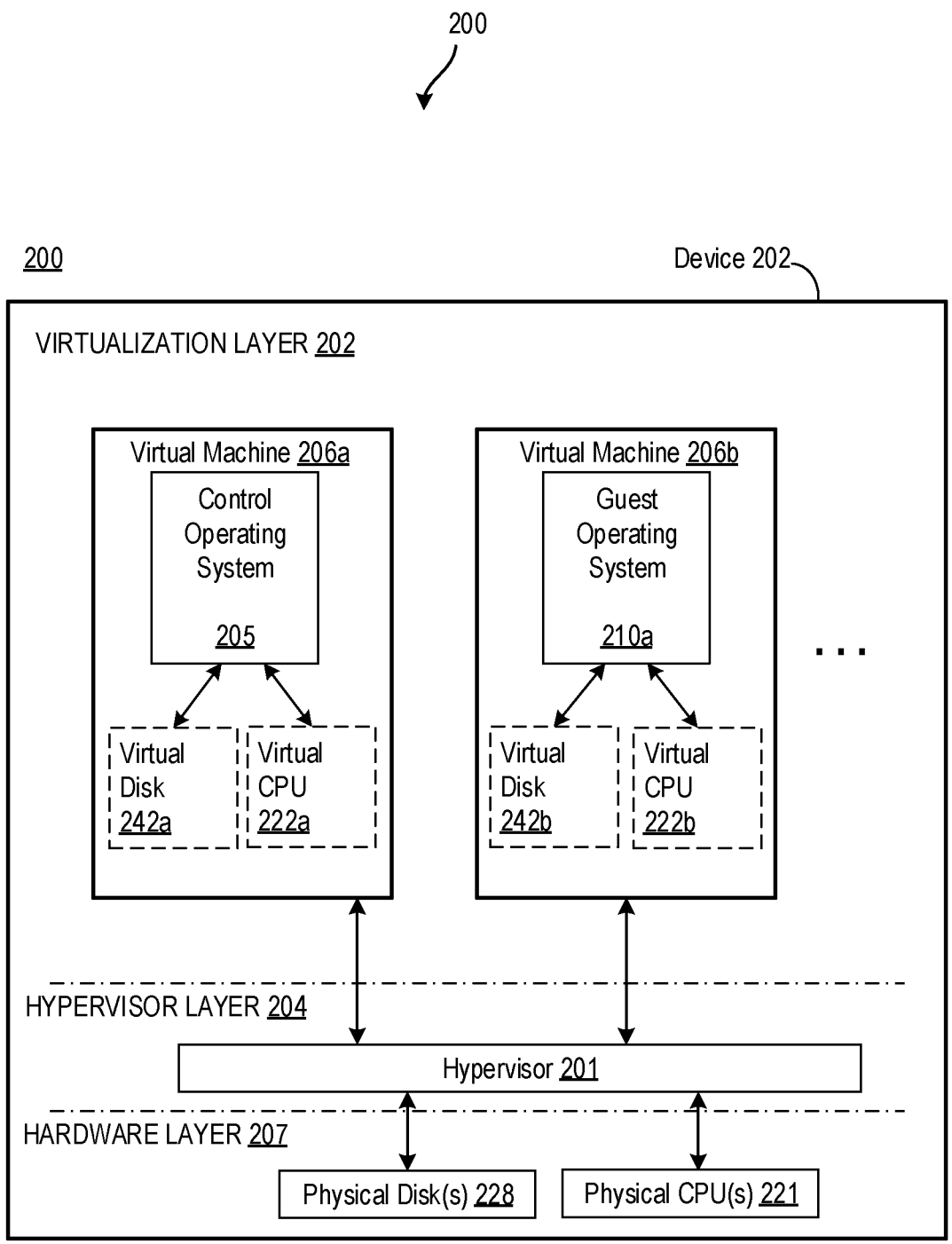
FIG. 2 is a block diagram of a virtualization environment, in accordance with an illustrative embodiment.

Although shown in FIG. 2 as including a single virtualized device 202, virtualized environment 200 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 200 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 206, for example on various cores of a multi-core processing system and/or various processors of a multiple processor device. For example, although generally shown herein as "processors", one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 200) on a client 165 or server 195, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

C. Systems and Methods for Accessing Files During Interruptions to Connectivity

In a networked environment, an enterprise may provide various services, such as virtual applications or desktops, to clients associated with the enterprise. The enterprise may host and maintain resources for these services on a remote server (e.g., a cloud-based service) to facilitate access to the virtual applications and desktops and to provide scalability, security, and ease of access. To access these services, a client may establish a session with the remote server, relying on an active network connection (e.g., the Internet). Through the virtual desktop or application, the client may access files hosted on the remote server. A user of the client may open, read, and edit the files using the virtual applications provided through the session.

In some cases, the network connection may be lost due to various reasons, such as power outage at the client, a breakdown at the network connection provider, or a failure at the remote server, among others. Due to the loss in network connection, the session would be disconnected and the client would be unable to access the virtual desktop or application, or any of the other resources, until the network connection is re-established. As a result, the client would be unable to continue accessing the files previously accessed via the session. The inability to access resources would lead to loss of functionality at the client and remote server, because the virtual desktop and services hosted on the remote server become inaccessible. In addition, there may be loss of data (e.g., loss of changes to a document) from the loss of connectivity, forcing the user to rework to recreate the changes. This would also degrade the quality of human-computer interactions (HCI) between the user and services, as the user may have to wait to access the file once the network connection is re-established.

To address these and other challenges, the files accessed through the session while the network connection is active may be securely stored and maintained on a local cache at the client, so that the files may be accessed when the network connection is lost. In conjunction, the remote server may also keep track and identify files that are accessed and actively used on the client via the session. For security purposes, the files stored and maintained in the cache may be encrypted to prevent entities besides the user of the client or the remote server to access the files. The time interval at which the copy of the file is stored and the synchronized may be configured by an administrator of the remote server. For example, the administrator can set a policy to store or synchronize the file at the set time interval while session is running over the network connection.

When the network connection is lost resulting in a disruption to the session, a virtual driver running on the client may transition to an offline mode. During the offline mode, the virtual driver may also prompt the user of the client whether to continue working on the same files actively used while the connection was active. If the user chooses to continue working via the prompt, the virtual driver may decrypt the file stored on the local cache and may identify a local application capable of opening the file based on a type of the file. If the user chooses not to continue working, the virtual driver may maintain the files stored on the local cache for a defined amount of time, allowing the user to access the file at a later time. The defined amount of time may be set by the administrator of the remote server, and upon expiration of the amount of time, the file may be deleted from the local cache. With the identification, the virtual driver may invoke the local application to access and open the file.

Afterwards, when the network connection is restored, the client may re-establish the session with the remote server. Having kept track of which files were actively being used prior to the loss of connectivity, the client may provide the previously accessed files were by the client during the outage. Upon receipt, the remote server may place the copy of file retrieved from the client in the same location (e.g., file directory) as the original file maintained by the service. The retrieved copy may have the same name with an indicator that the file was retrieved from the client, such as "_offline" suffix added to the name identifying that file was worked on during the disruption. The user of the client may view and select from the two copies of the file via the virtual desktop or application in the session to continue accessing and working on one of the files.

By storing the encrypted files on the local cache, the client may continue to access the previously used files while maintaining security over the files, despite the loss to the network connection and the resultant disruption to the session. In this manner, the client may also alleviate the loss of functionality arising from the inability to access the virtual desktop, application, and other resources hosted on the remote server. Additionally, the HCI between the user and the session would be improved, as the user no longer has to wait to access the file until restoration of the network connection.

Figure 3:
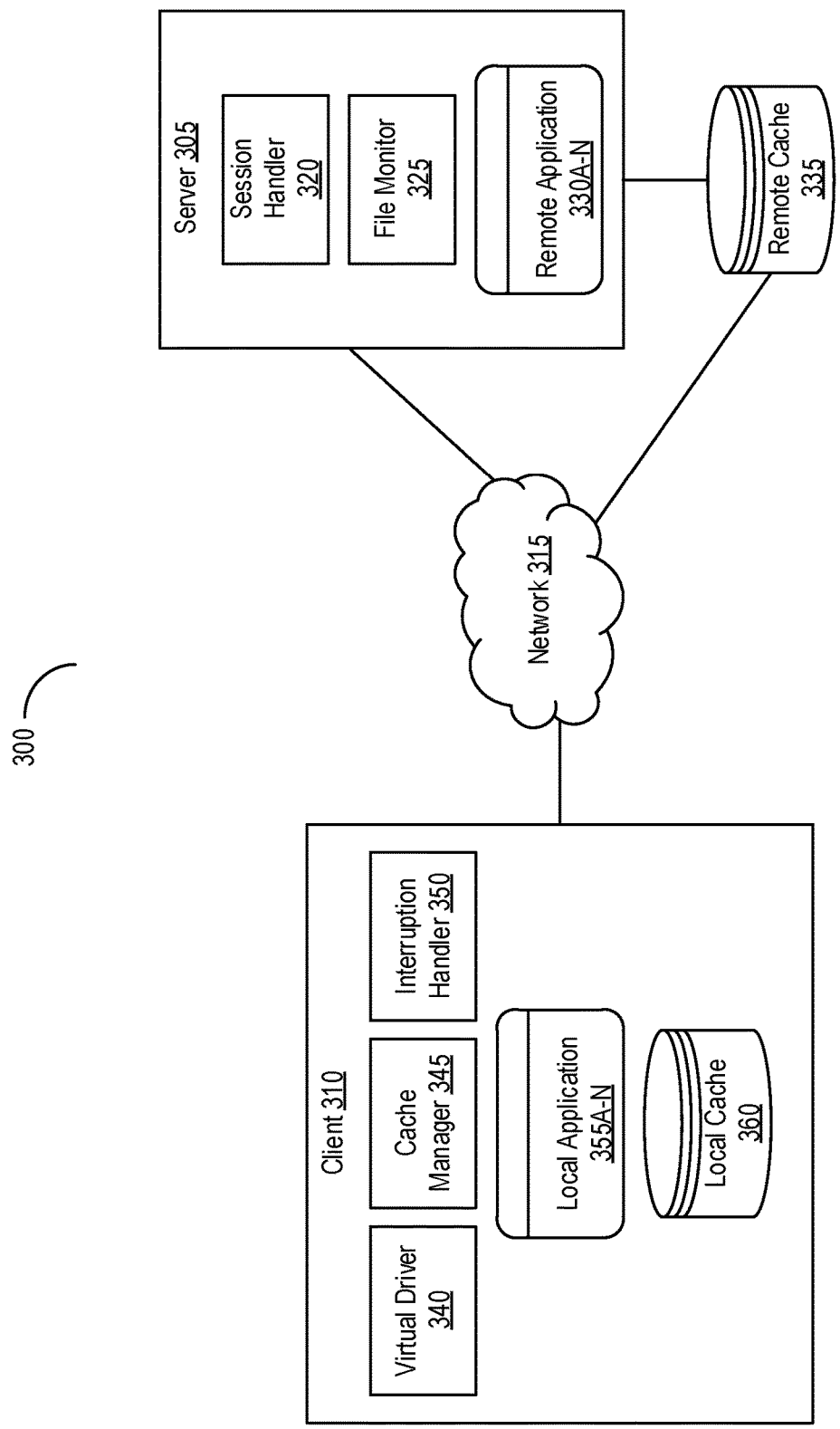
FIG. 3 is a block diagram of a system for accessing files during interruptions to connectivity in accordance with an illustrative embodiment.

Referring now to FIG. 3, depicted is a block diagram of a system 300 for accessing files. In brief overview, the system 300 may include at least one server 305 (sometimes herein referred to as a remote computing device or remote service) and at least one client 310 communicatively coupled with each other via at least one network 315. The server 305 may include at least one session handler 320 (sometimes herein referred to as a server-side virtual driver), at least one file monitor 325, a set of remote applications 330A-N (hereinafter referred to as remote applications 330), and at least one remote cache 335. In some embodiments, the file monitor 325 may be a part of the session handler 320. The client 310 may include at least one virtual driver 340 (sometimes herein referred to as a client-side virtual driver), at least one cache manager 345, at least one interruption handler 350, a set of local applications 355A-N (hereinafter referred to as local applications 355), and at least one local cache 360, among others. In some embodiments, the cache manager 345 or the interruption handler 350 may be a part of the virtual driver 340. In some embodiments, the local cache 360 may be a part of the cache manager 345 or the virtual driver 340 on the client 310.

Each of the above-mentioned elements or entities is implemented in hardware, or a combination of hardware and software, in one or more embodiments. Each component of the system 300 may be implemented using hardware or a combination of hardware or software detailed above in connection with FIGS. 1A-2. For instance, each of these elements or entities can include any application, program, library, script, task, service, process or any type and form of executable instructions executing on hardware of the server 305 (including the session handler 320, the file monitor 325, the remote applications 330, and the remote cache 335) and the client 310 (including the virtual driver 340, cache manager 345, the interruption handler 350, the local applications 355, and the local cache 360). In some embodiments, the server 305 may be an instance of the device 202 as discussed above. The hardware includes circuitry such as one or more processors in one or more embodiments.

Figure 4A:
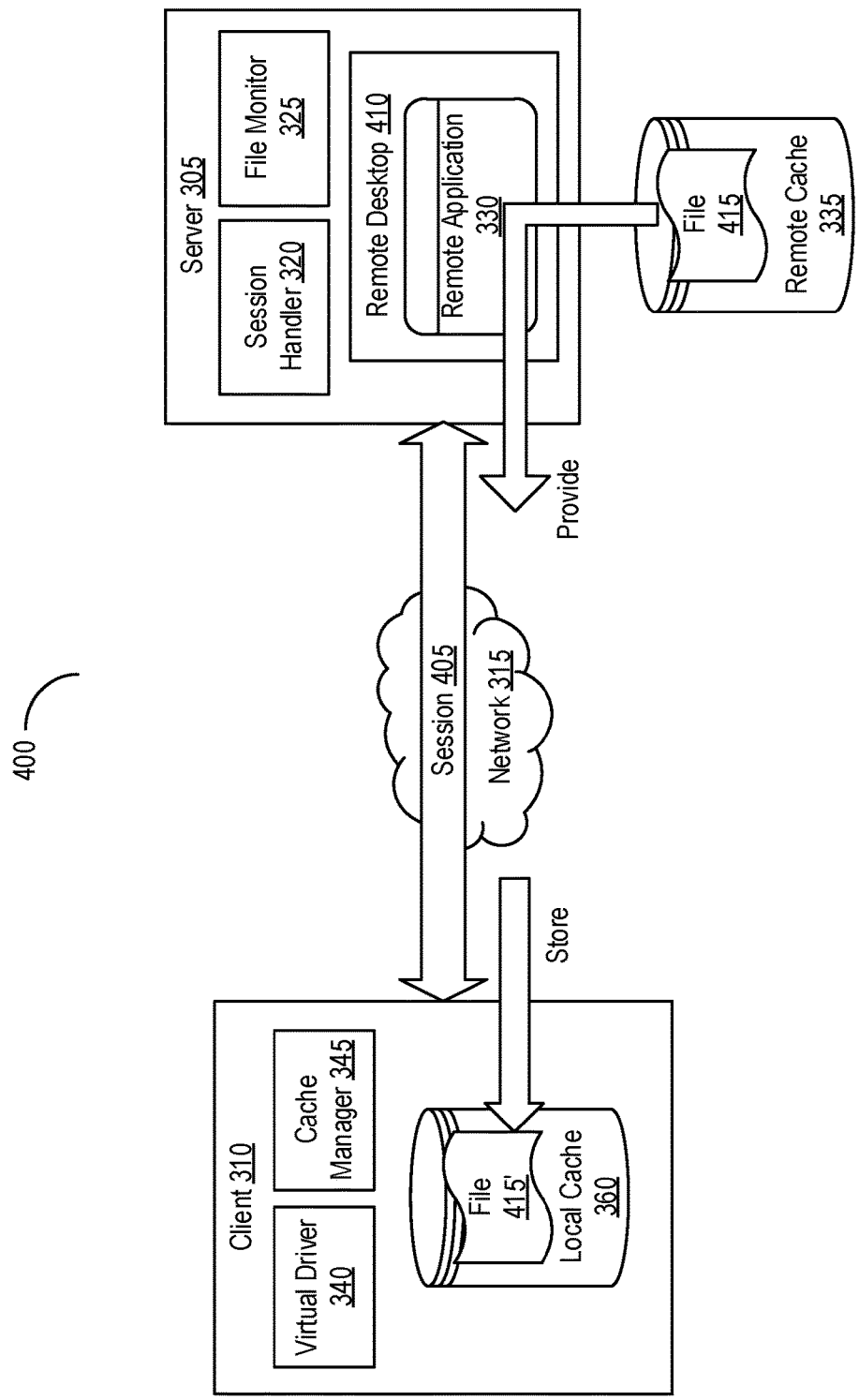
FIG. 4A is a block diagram of a process for establishing sessions to provide virtual desktops in the system for accessing files in accordance with an illustrative embodiment.

Referring now to FIG. 4A, depicted is a block diagram of a process 400 for establishing sessions to provide virtual desktops in the system 300 for accessing files. The process 400 may include various operations performed by the server 305 and the client 310 to establish sessions. Under the process 400, the virtual driver 340 executing on the client 310 may initialize and establish at least one session 405 with the server 305. The session 405 may be used to by the virtual driver 340 on the client 310 to access the remote application 330 in at least one remote desktop 410 (sometimes herein referred to as a virtual desktop) on the server 305. The session 405 may also permit secure communication over the network 315 between the virtual driver 340 of the client 310 and the remote desktop 410 including the remote application 330 on the server 305. In some embodiments, the establishment of the session 405 may be in accordance with a handshaking protocol between the server 305 and the client 310. In some embodiments, the remote desktop 410 may be an instance of the virtual machine 206 or executed on the virtual machine 206 as discussed above.

In establishing, the virtual driver 340 may provide, transmit, or otherwise send a request to establish the session 405 to the server 305. In some embodiments, the request may be to launch, instantiate, or otherwise create the remote desktop 410 on the server 305 to access the remote application 330.

For example, a user of the client 310 may open a client application (e.g., an agent) which the virtual driver 340 is a part of for launching the remote desktop 410. The user may enter authentication credentials, such as an account identifier and a passcode, via the application. Upon entry, the virtual driver 340 may generate the request to access to the server 305. In some embodiments, the request may identify the remote application 330 to be accessed by the virtual driver 340 on the client 310, the user of the client 310, or the remote desktop 410 to be launched, among others. The virtual driver 340 may transmit the request to the server 305 via the network 315.

The session handler 320 of the server 305 may retrieve, identify, or otherwise receive the request from the client 310. The session handler 320 may parse the request to extract or identify the remote application 330, the user of the client 310, or the remote desktop 410, among others. The remote application 330 may include or correspond to a resource, a program, or executable hosted on the server 305. For example, the remote application 330 may be a virtualized application, and may include a variety of applications, such as word processor, an image editor, a video editor, a web browser, and an electronic mail agent, among others. The remote desktop 410 may include or correspond to a user interface or environment in which one or more remote applications 330 may be arranged. For instance, the remote desktop 410 may be a virtual desktop of a virtualized environment hosted on the server 305, such as the desktop described above in Section B. Data exchanged through the session 405, the remote desktop 410, and the remote application 330 may be prevented from exfiltration or accessing data from outside the session 405, the remote desktop 410, and the remote application 330 (e.g., using encryption). The data including the file 415 may be accessible outside the session 405, the remote desktop 410, and the remote application 330 through the cache manger 345, as discussed herein below.

With receipt of the request, the session handler 320 may complete the initialization and establishment of the session 405 between the server 305 and the client 310 over the network 315. In completing, the session handler 320 may identify the remote desktop 410 with the remote application 330 to provide to the client 310 via the session 405. In some embodiments, the session handler 320 may select an already existing remote desktop 410 with the identified remote application 330 to provide via the session 405 for the client 310. In some embodiments, the session handler 320 may instantiate, launch, or otherwise create the remote desktop 410 including the remote application 330 for the client 310. For example, the session handler 320 may generate a virtual machine for the remote desktop 410 with the remote application 330 to be accessed by the client 310. Upon identification, the session handler 320 may send, transmit, or otherwise provide a rendering of the remote application 330 in the remote desktop 410 via the session 405 to the client 310. The session handler 320 may continue to stream, transmit, or provide a rendering of the remote desktop 410 with the remote application 330 and other resources to the client 310 while the connection via the session 405 between the server 305 and the client 310 is active.

The virtual driver 340 on the client 310 may in turn retrieve, identify, or otherwise receive the remote desktop 410 with the remote application 330 via the session 405 from the server 305. While receiving, the virtual driver 340 may load the remote desktop 410 with the remote application 330 on to the client 310. In loading, the virtual driver 340 may display or otherwise present the rendering of the remote desktop 410 or the remote application 330 onto a display of the client 310. Once loaded, the virtual driver 340 may monitor for user interactions with the remote desktop 410 and the remote application 330 via input/output (I/O) devices of the client 310. Upon detection of the interactions, the virtual driver 340 may transmit, send, or provide data identifying the interactions to the server 305.

Through the remote application 330, the virtual driver 340 may request for at least one file 415 on the server 305 over the session 405. In some embodiments, the request may correspond to data identifying one or more interactions to load or present the file 415 on the remote application 330 in the remote desktop 410. The file 415 may be stored and maintained on the remote cache 335 accessible through the server 305. For example, the virtual driver 340 may detect a user interaction on an icon corresponding to the file 415 within a file open prompt of the remote application 330. In some embodiments, the request may correspond to data identifying one or more interactions to create the file 415 on the remote cache 335.

The file 415 may be stored, maintained, or otherwise located on the remote cache 335. The file 415 may include content accessible via the remote application 330. The content may include text, image, video, audio, and other data, or any combination thereof. For example, the file 415 may include audiovisual content to be accessed by a media player in the remote desktop 410. The location of the file 415 may be identified using a file path. The file path for the file 415 may be an alphanumeric string referencing a location of the file 415 within the remote cache 335. For example, the file path may be a uniform resource identifier (URI) or uniform resource locators (URL), and may include a substring for a host (e.g., the server 305 or the remote cache 335), substrings for one or more directories within the remote cache 335, and a substring for a file name for the file 415. The substring for the file name may identify or include a file type of the file 415, using a file extension. The type of content in the file 415 may be identified by the file type or extension for the file 415 in the file path.

The session handler 320 of the server 305 may in turn receive or identify the request for the file 415 from the client 310 via the session 405. Upon receipt, the session handler 320 may parse the interactions indicated in the request. If the interaction is to load the file 415, the session handle 320 may determine or identify the file 415 to be retrieved from the remote cache 335. In some embodiments, the session handler 320 may parse the request to extract or identify the file path, including the host, one or more directories, and the file name, referencing the file 415 in the remote cache 335. Using the file path, the session handler 320 may find, select, or identify the file 415 maintained on the remote cache 335. If the interaction is to create a new file 415, the session handler 320 may create, instantiate, or otherwise generate the file 415 at the identified file path in the remote cache 335. With the identification from the remote cache 335, the session handler 320 may stream or provide a rendering of the contents of the file 415 in the remote application 330 for the client 310 via the session 405.

The virtual driver 340 may in turn retrieve, identify, or otherwise receive the rendering of the file 415 from the server 305. The remote application 330 accessed through the virtual driver 340 of the client 310 may display, or otherwise present the rendering of the contents of the file 415 provided by the server 305. Once loaded and presented, the user of the client 310 may use the remote application 330 to read and edit the file 415 within the remote desktop 410. As discussed above, the virtual driver 340 may continue to monitor for user interactions with the remote desktop 410 and the remote application 330 via input/output (I/O) devices of the client 310. The virtual driver 340 may send data identifying the interactions to the server 305.

In conjunction, the file monitor 325 may monitor for active use of the file 415 within the remote desktop 410. In some embodiments, the monitoring for active use may be performed at a time interval. The time interval may be defined by an administrator of the server 305, the remote application 330, or the remote desktop 410, and may range anywhere between 30 seconds to 3 hours. Active use may correspond to performance of actions (e.g., opening, viewing, editing, creating, saving, closing, or printing) to the file 415 within the remote desktop 410. For example, while under active use, the remote application 330 may perform actions with respect to the file 415 within the remote desktop 410 in accordance with the user interactions detected via the client 310. Upon receipt of the data identifying the interactions from the client 310 via the session 410, the session handler 320 may perform the actions and may pass the actions to the file monitor 325. Based on the data identifying the interactions at the client 310, the file monitor 325 may determine whether the file 415 is under active use. In some embodiments, the determination may be based on detection of access (e.g., creating, viewing, editing, or opening) of the file 415 within the remote application 330 or the remote desktop 410.

Based on whether the file 415 is under active use, the session handler 320 may determine whether to send, transmit, or otherwise provide the file 415 itself to the client 305. If no user interaction with the contents of the file 415 or accessing of the file 415 is detected within the remote desktop 410, the file monitor 325 may determine that the file 415 is not under active use. When the file 415 is determined to not be under active se, the session handler 320 may determine to refrain from providing the file 415. Conversely, if user interaction with the contents of the file 415 or accessing of the file 415 detected within the remote desktop 410, the file monitor 325 may determine that the file 415 is under active use. When the file 415 is determined to be under active use, the session handler 320 may transmit, send, or otherwise provide the file 415 itself to the client 310. The provision may be via the session 405 or out of band outside the session 405. The session handler 320 may continue to send the file 415 to the client 310 for storage at a time interval. The time interval may be defined by an administrator of the server 305, the remote application 330, or the remote desktop 410, and may range anywhere between 30 seconds to 3 hours.

Upon receipt of the file 415 from the server 405, the cache manager 345 executing on the client 310 may store and maintain a copy of the file 415 as at least one file 415' on the local cache 360. The local cache 360 may correspond to a disk space in a hard drive accessible to the client 310 during the disruption or one or more regions in memory of the client 310. The cache manager 345 may store the file 415 as the copy of the file 415' on the local cache 330 each time the file 415 is received from the server 305. The receipt of the file 415 and by extension the storage of the file 415 as the file 415' on the local cache 360 may be at a time interval. The time interval may be defined by an administrator of the server 305, the remote application 330, or the remote desktop 410, and may range anywhere between 30 seconds to 3 hours.

In storing, the cache manager 345 may encrypt the file 415'. The encryption may be to restrict accessing of the file 415' outside the remote application 330, the remote desktop 410, and the local application 355. The encryption of the file 415' may be in accordance with a cryptographic algorithm, such as a symmetric algorithm (e.g., Advanced Encryption Standard (AES)), among others. Upon encryption, the cache manager 345 may store the file 415' onto the local cache 360. The cache manger 345 may keep track of a location (e.g., using a file path) of the file 415' in the local cache 360.

Figure 4B:
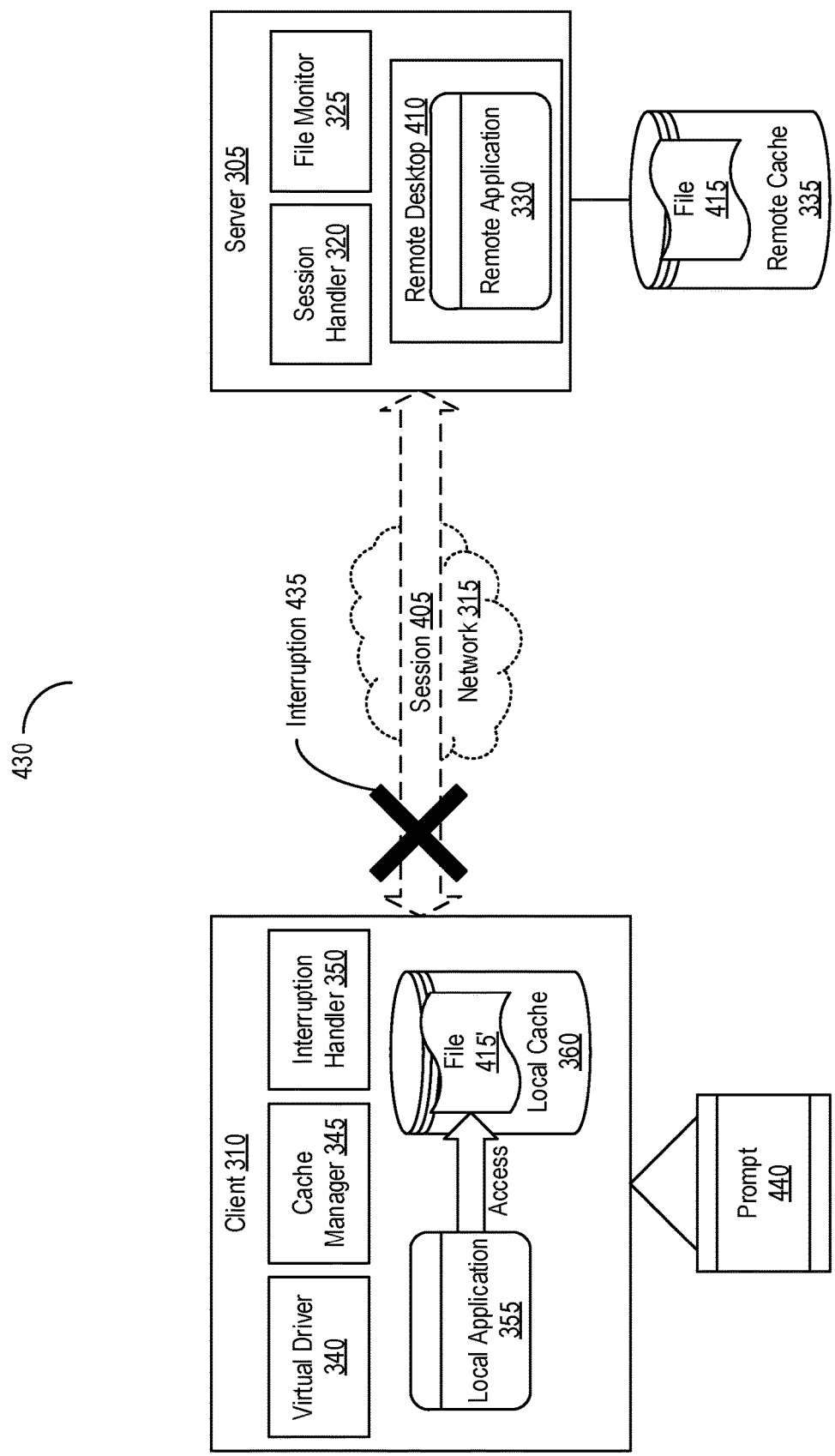
FIG. 4B is a block diagram of a process for accessing files during interruptions in the system for accessing files in accordance with an illustrative embodiment.

Referring now to FIG. 4B, depicted is a block diagram of a process 430 for accessing files during interruptions in the system 300 for accessing files. The process 430 may include various operations performed by the server 305 and the client 310 upon an interruption 435 to the session 405 established between the server 305 and the client 310. Under the process 430, the virtual driver 340 may monitor for loss in connectivity between the server 305 and the client 310 via the session 405 over the network 315. In some embodiments, the virtual driver 340 may monitor the communications between the server 305 and the client 310 through the session 405 over a time period (e.g., ranging between 30 seconds to 5 minutes). If the communications are detected over the time period, the virtual driver 340 may determine or identify that no loss in connectivity and that the session 405 is active. Conversely, if no communications are detected over the time period, the virtual driver 340 may determine or identify a loss in connectivity, and may invoke the interruption handler 350. In some embodiments, the virtual driver 340 may use an operating system on the client 310 to detect the loss in connectivity. When the operating system detects the loss in connectivity, the operating system may notify or provide an indication of the loss in connectivity to the virtual driver 340. Upon receipt, the virtual driver 340 may determine the loss in connectivity. The loss in connectivity may correspond to: the interruption 435 to the session 405; inability by the client 310 to access the server 305, the remote application 330, or the remote desktop 410; or disruption to the active use of the file 415.

Upon detection of the loss in connectivity, the interruption handler 350 executing on the client 310 may find, select, or otherwise identify the one or more local applications 355 to access the file 415' based on a file type of the file 415'. The file type may correspond to a format or protocol used to encode the file 415', and may be indicated of a type of content within the file 415'. For example, one file type may correspond to a particular encoding for a file 415' including audiovisual content. The interruption handler 350 may identify the identifier for the file 415' maintained on the local cache 360. With the identification, the interruption handler 350 may extract the substring for the file type of the file 415' (e.g., the file extension at the end of the file name) from the identifier. Based on the substring, the interruption handler 350 may identify the file type for the file 415'.

The interruption handler 350 may identify the local application 355 configured to or capable of accessing or reading the file 415' based on the type of file. In some embodiments, the interruption handler 350 may access an operating system local to the client 310 to extract a list of file associations. The list may identify the local applications 355 capable of opening the file type based on the file extension. From the list, the interruption handler 350 may find the local application 355 identified as configured to access the file 415' using the file type. In some embodiments, the interruption handler 350 may access an application programming interface (API) defined for the local application 355. The API may specify one or more file types that the local application 355 is capable of or configured to access. If the API identifies that the local application 355 is configured to access file type of the file 415', the interruption handler 350 may identify the local application 355 to use to access the file 415'.

With the identification, the interruption handler 350 may display, render, or otherwise present at least one prompt 440 for whether to continue accessing of the file 415' (or the file 415) using the local application 355. In some embodiments, the prompt 440 may be a graphical user interface presented via the display of the client 310. The prompt 440 may include a user interface element for rejecting continued access of the file 415' and a user interface element for acceptance of continued access of the file 415'. In some embodiments, the user interface element in the prompt 440 for acceptance may further identify the local application 335 to be used to access the file 415'. The interruption handler 350 may monitor for an interaction by the user of the client 310 with the prompt 440.

When the selection is for the rejection of the continued access on the prompt 440, the interruption handler 350 may refrain from using the local application 355 to access the file 415'. In some embodiments, the interruption handler 350 may invoke or direct the cache manager 345 to maintain the file 415' on the local cache 360. The file 415' may be maintained for a time period following the detection of the loss in connectivity, ranging between 5 minutes to 1 week. The maintenance of the file 415' on the local cache 360 may be to allow the user of the client 310 to access the file 415' at a later time. For example, the user may sometime later re-open the prompt 440, and select to continue accessing the file 415'. In some embodiments, the interruption handler 350 may direct or invoke the cache manager 345 to remove or delete the file 415' from the local cache 360 upon the rejection of continued access.

In contrast, when the selection is for the acceptance of the continued access on the prompt 440, the interruption handler 350 may use the local application 355 to access the file 415'. In some embodiments, the interruption handler 350 may display, render, or otherwise present another prompt 440 to select the local application 355 to access the file 415', upon selection of the acceptance of continued access. The interruption handler 350 may have identified multiple local applications 355 capable of accessing the file 415' based on the file type. The prompt 440 may include a set of user interface elements corresponding to the local application 355 to access the file 415'. The selection of one of the user interface elements may correspond to a selection of the corresponding local application 355 for accessing the file 415'. Upon selection of the user interface element on the prompt 440, the interruption handler 350 may identify the corresponding local application 355 as selected to access the file 415'.

To access the file 415', the interruption handler 350 may direct or invoke the cache manager 345 to decrypt the file 415' maintained on the local cache 360. Upon invocation, the cache manager 345 may access the local cache 360 to retrieve or identify the file 415' (e.g., using the identifier for the file 415'). The cache manager 345 may also decrypt the file 415' using the cryptographic algorithm that was used to encrypt the file 415'. With the decryption, the interruption handler 350 may launch, open, or otherwise invoke the identified local application 355 to access the decrypted file 415'. The interruption handler 350 may convey or provide the file 415' to the local application 355 running on the client 310. In some embodiments, the interruption handler 350 may label, mark, or otherwise identify the file 415' as accessed during the loss to connectivity. In some embodiments, the interruption handler 350 may store and maintain an association between the identification as accessed with the file 415 on the local cache 360. For example, the interruption handler 350 may generate a marker indicating that the identified file 415 as accessed during the disruption, and associate the marker with the file 415' on the local cache 360.

The local application 355 in turn may display, render, or otherwise present the file 415'. Once loaded and presented, the user of the client 310 may use the local application 350 to read and edit the contents of the file 415'. While under active use, the local application 355 may process and modify the file 415 in accordance with the user interactions detected via the client 310. The local application 355 may store and maintain the file 415' including any modifications by the user of the client 310 onto the cache manager 345. The storage of the file 415' may be automated (e.g., at an interval set by the local application 355) or on command (e.g., user interaction with the save function of the local application 355). In some embodiments, the interruption handler 350 may convey or provide the file 415' including any modifications to the cache manager 345. The cache manager 345 may in turn update the file 415' on the local cache 360. The cache manager 345 may also apply encryption in storing the updated file 415'. In some embodiments, the cache manager 345 may label, mark, or otherwise identify the file 415' as accessed or updated during the disruption, in response to the update. The cache manager 345 may store and maintain an association between the identifier indicating that the file 415' was accessed and the file 415' itself on the local cache 360.

In conjunction, the session handler 320 on the server 305 may monitor for a loss in the connectivity between the server 305 and the client 310 via the session 405 over the network 315. The monitoring of the connectivity by the session handler 320 may be similar to the operations of the virtual driver 340 on the client 310 in monitoring for the loss in connectivity. In some embodiments, the session handler 320 may monitor the communications between the server 305 and the client 310 through the session 405 over a time period (e.g., ranging between 30 seconds to 5 minutes). If the communications are detected over the time period, the session handler 320 may determine or identify that no loss in connectivity and that the session 405 is active. Conversely, if no communications are detected over the time period, the session handler 320 may determine or identify a loss in connectivity and that the session 405 is inactive.

Upon detection of the loss in connectivity, the file monitor 325 on the server 305 may identify the file 415 that was under active use at the client 310 prior to the disruption. With the identification, the file monitor 325 may mark, label, or otherwise identify the file 415 as to be synchronized upon re-establishment of the connectivity between the server 305 and the client 310. In some embodiments, the file monitor 325 may store and maintain an association between the identification with the file 415 on the remote cache 335. For example, the file monitor 325 may generate a marker indicating that the identified file 415 is to be synchronized, and associate the marker with the file 415 on the remote cache 335. In some embodiments, the file monitor 325 may also identify the remote application 330 in which the file 415 was accessed, the remote desktop 410 in which the remote application 330 resided, and the client 310 associated with the file 415 identified as to be synchronized. The file monitor 325 may store and maintain an association of the identified the remote application 330, the remote desktop 410, and the client 310 with the file 415 to be synchronized.

Figure 4C:
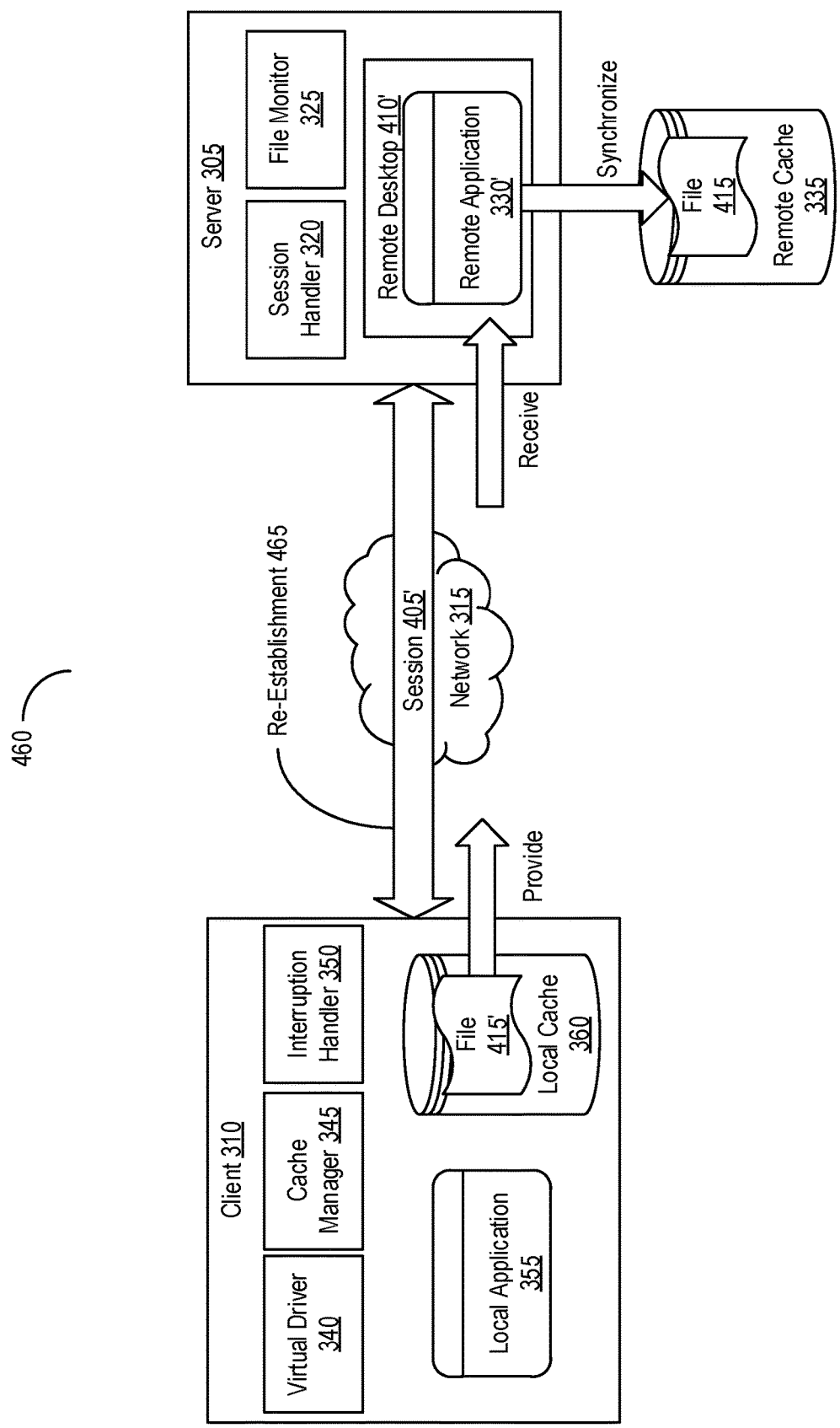
FIG. 4C is a block diagram of a process for re-establishing sessions to synchronize files in the system for accessing files in accordance with an illustrative embodiment.

Referring now to FIG. 4C, depicted is a block diagram of a process 460 for accessing files during interruptions in the system 300 for accessing files. The process 460 may include various operations performed by the server 305 and the client 310 subsequent to re-establishment 465 of connectivity between the server 305 and the client 310 over the network 315. After the loss of connectivity, the client 310 may subsequently re-establish connectivity with the network 315. Even after re-establishment of the connectivity, the user may continue to access the file 415' on the client 310. The re-establishment of connectivity may allow or permit the user of the client 310 to reconnect with the server 305 to access the remote application 330 or the remote desktop 410 provided by the server 305.

Subsequent to the re-establishment of connectivity, the virtual driver 340 may initialize or establish at least one session 405' between the server 305 and the client 310 over the network 315. For example, after establishing connectivity with the network 310, a user of the client 310 may open a client application (e.g., an agent) which the virtual driver 340 is a part of for launching the remote desktop 410. The user may enter authentication credentials, such as an account identifier and a passcode, via the application. Upon entry, the virtual driver 340 may generate the request to access to the server 305. The session 405' may be similar to the session 405, and may be used by the virtual driver 340 on the client 310 to access the remote application 330' in at least one remote desktop 410' on the server 305. The establishment and the functionality of the session 405' may be similar to the session 405 as discussed above.

In establishing, the virtual driver 340 may provide, transmit, or otherwise send the request to establish the session 405' to the server 305. The session 405' may also permit secure communication over the network 315 between the virtual driver 340 of the client 310 and the remote desktop 410' including the remote application 330' on the server 305. In some embodiments, the establishment of the session 405' may be in accordance with a handshaking protocol between the server 305 and the client 310. In some embodiments, the request may be to launch, instantiate, or otherwise create the remote desktop 410' on the server 305 to access the remote application 330' for the session 405'. In some embodiments, the generation of the request may be upon entry of authentication credentials as discussed above. In some embodiments, the generation of the request may omit the entry of the authentication credential. In some embodiments, the request may identify the remote application 330' to be accessed by the virtual driver 340 on the client 310, the user of the client 310, or the remote desktop 410' to be launched, among others. The virtual driver 340 may transmit the request to the server 305 via the network 315.

The session handler 320 of the server 305 may retrieve, identify, or otherwise receive the request from the client 310. The session handler 320 may parse the request to extract or identify the remote application 330', the user of the client 310, or the remote desktop 410', among others. With receipt of the request, the session handler 320 may complete the initialization and establishment of the session 405' between the server 305 and the client 310 over the network 315. In completing, the session handler 320 may identify the remote desktop 410' with the remote application 330' to provide to the client 310 via the session 405'. In some embodiments, the session handler 320 may select an already existing remote desktop 410' with the identified remote application 330' to provide via the session 405' for the client 310. The remote desktop 410' may be the same as the remote desktop 410 for the previous session 405. In some embodiments, the session handler 320 may instantiate, launch, or otherwise create the remote desktop 410' including the remote application 330' for the client 310. The remote desktop 410' may be an instance different from the remote desktop 410 for the session 405 prior to the disruption. Upon identification, the session handler 320 may send, transmit, or otherwise provide the remote application 330' in the remote desktop 410' via the session 405' to the client 310. The session handler 320 may continue to stream or provide the rendering of the remote desktop 410' with the remote application 330' and other resources to the client 310.

The virtual driver 340 on the client 310 may in turn retrieve, identify, or otherwise receive the remote desktop 410' with the remote application 330' via the session 405' from the server 305. While receiving, the virtual driver 340 may load the remote desktop 410' with the remote application 330' on to the client 310. In loading, the virtual driver 340 may render, display, or otherwise present the remote desktop 410' or the remote application 330' onto a display of the client 310. In some embodiments, the remote desktop 410' and the remote application 330' may be the same remote desktop 410 and remote application 330 respectively from the previous session 405. In some embodiments, the remote desktop 410' and the remote application 330' may be different from the remote desktop 410 and remote application 330, respectively from the remote desktop 410 from the previous session 405. Once loaded, the virtual driver 340 may monitor for user interactions with the remote desktop 410' and the remote application 330' via the I/O devices of the client 310.

In conjunction, with the re-establishment of the session 405', the interruption handler 350 may check or determine whether the file 415' was accessed during the disruption corresponding to the loss in connectivity. The check may be performed independent of the file monitor 325 sending the request to provide the file 415'. To check, the interruption handler 350 may access the local cache 360 to identify or determine whether the file 415' was accessed during the disruption. In some embodiments, the interruption handler 350 may find, check for, or otherwise identify the identifier indicating that the file 415' was accessed or updated during the disruption from the local cache 360. When the identifier is not found on the local cache 360, the interruption handler 350 may determine that the file 415' was not accessed during the disruption. With the determination that the file 415' was not accessed, the interruption handler 350 may refrain from providing the file 415' to the server 305. The user of the client 310 may continue to access and use the file 415' on the local cache 360. In contrast, when the identifier is found, the interruption handler 350 may determine that the file 415' was accessed during the disruption. With the determination that the file 415' was accessed, the interruption handler 350 may find or identify the file 415' in the local cache 360. In some embodiments, the interruption handler 350 may direct the cache manager 345 to decrypt the file 415'. With the identification, the interruption handler 350 may provide, send, or otherwise transmit the file 415' to the server 305 via the session 405'. The provision of the file 415' to the server 305 may be to synchronize with the corresponding file 415 on the remote cache 335.

Upon receipt, the file monitor 325 on the server 305 may synchronize the file 415 maintained on the remote cache 335 with the file 415' from the client 310. The file monitor 325 on the server 305 may retrieve, identify, or receive the file 415' from the client 310 via the session 405'. With receipt, the file monitor 325 may identify the file path of the file 415 corresponding to the file 415'. As discussed above, the file path may reference the location of the file 415 within the remote cache 335. In some embodiments, the file monitor

325 may identify a directory in which the file 415 is located on the remote cache 335, using the file path of the file 415 corresponding to the file 415'. With the identification, the file monitor 325 may store and maintain the file 415' in the same directory with an indicator that the file 415' was retrieved from the client 310. For example, the file monitor 325 may add the indicator (e.g., "_offline" suffix) to the file name of the file 415' and store the file 415' on the same directory as the file 415 in the remote cache 335. In some embodiments, the file monitor 325 may replace the file 415 with the file 415' from the client 310 on the remote cache 335. For instance, the file monitor 325 may delete the original file 415, and may store and maintain the file 415' at the same file path as the file 415.

By storing and maintaining the copy of the file 415 as the file 415' on the local cache 360, the user of the client 310 may continue to access the file 415, even with the loss in connectivity over the network 315 and the disruption to the session 405. In doing so, the reduction in the functionalities in the client 310 arising from the inability to access the resources on the server 305, such as the remote application 330, the remote desktop 410, and the file 415, may be alleviated. The maintenance in functionalities may thus improve the overall functionality of the client 310. Furthermore, because the file 415' is encrypted while maintained in the local cache 360, the contents of the file 415' may be prevented from exfiltration outside the local application 355, the remote application 330 or 330', the session 405 or 405', and the remote desktop 410 or 410', among others. The restriction from leakage may thus protect the security and integrity of the contents in the file 415 or 415'. The quality in human computer interaction (HCI) between the user and the session 405 or 405' may also be enhanced, as the user no longer has to wait to access the file 415 or 415' until restoration of connectivity with the network 315.

Figure 5A:
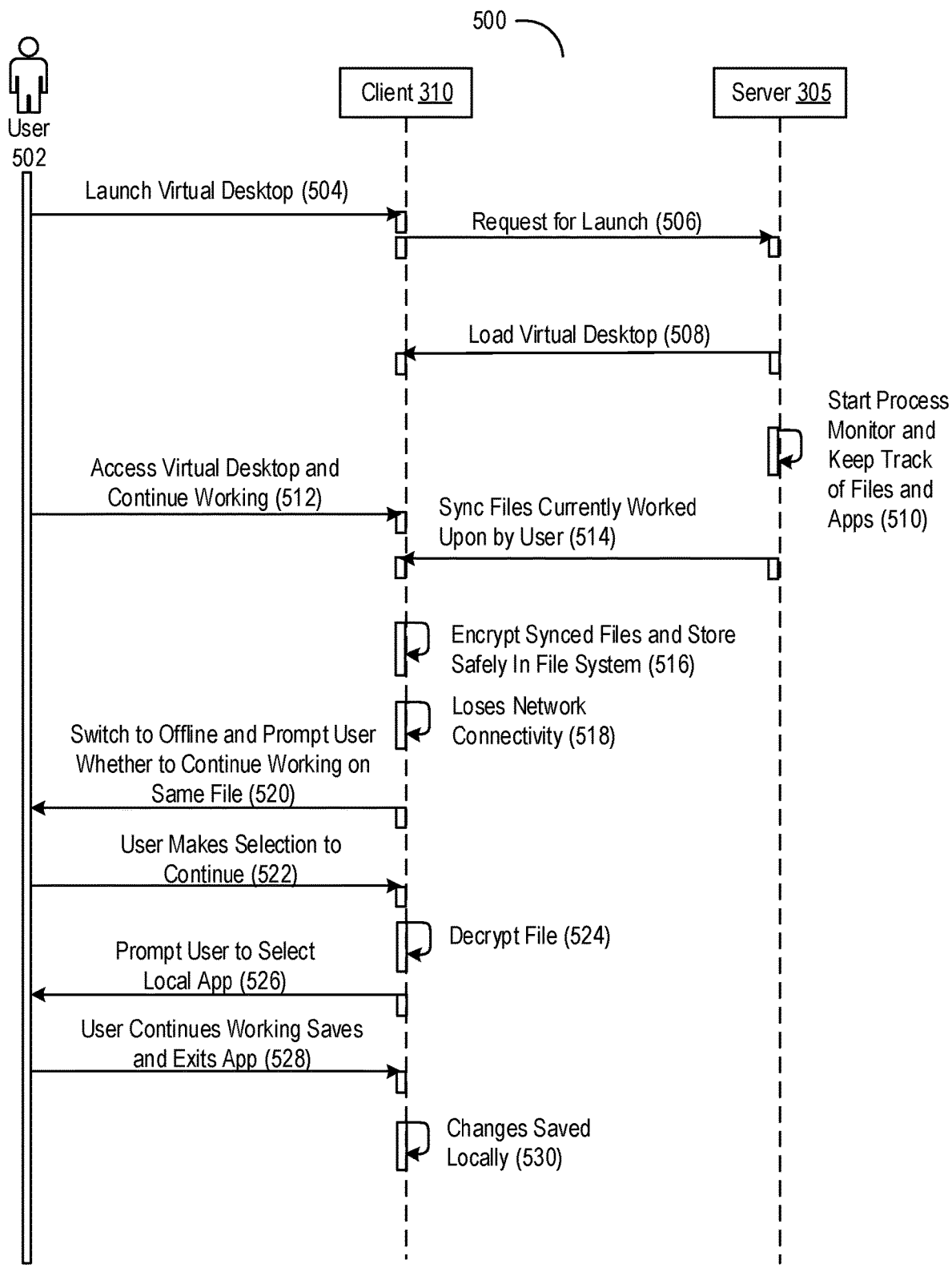
FIGS. 5A and 5B are communication diagrams of a method of accessing files from during interruptions to connectivity in accordance with an illustrative embodiment.
Figure 5B:
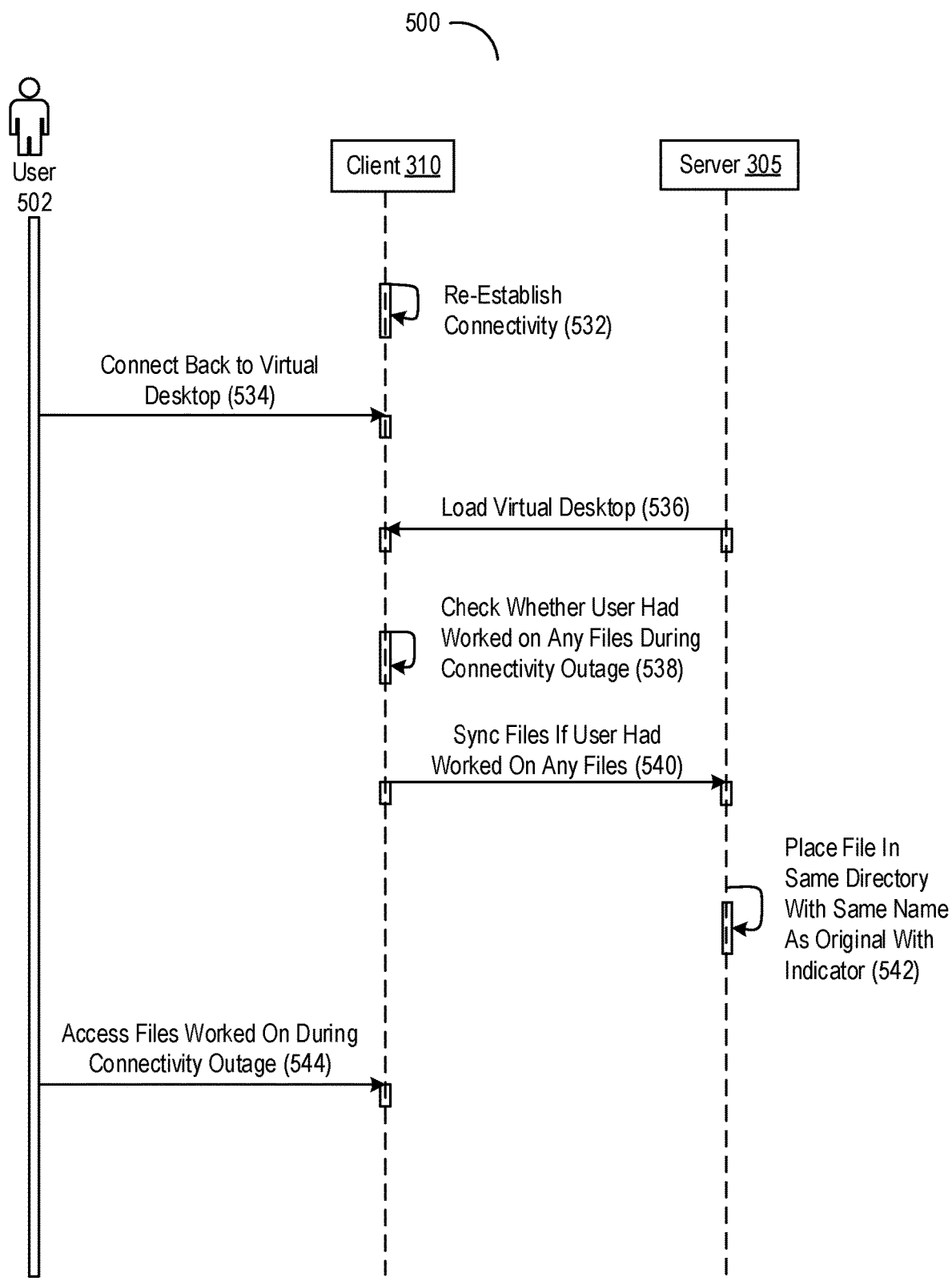

Referring now to FIGS. 5A and 5B, depicted are communication diagrams of a method 500 of accessing files from during interruptions to connectivity. The operations and functionalities of the method 500 may be performed by the components described in FIGS. 1A-4C, such as the server 305 and the client 310 detailed above and a user 502 as described. Under method 500, a user 502 may launch a virtual desktop (504). The client 310 may send a request for launch (506) to the server 305. The server 305 may load the virtual desktop (508) onto the client 310. The server 305 may start process, monitor, and keep track of files and applications (510) accessed through the virtual desktop. The user 502 may access the virtual desktop and continue working (512). The server 305 may synchronize files currently worked on by the user (514). The client 310 may encrypt the file and store safely in a file system (516).

Subsequently, the client 310 may lose network connectivity (518) with the server 305. The client 310 may switch offline and prompt the user 502 whether to continue working on the same file (520). The user 502 may make selection to continue working (522). The client 310 may decrypt the file (524). The client 310 may prompt the user to select the local application (526). The user 502 may continue working on the file, save the file, and exit the local application (528). The client 310 may save the changes to the file locally (530).

Continuing on, the client 310 may re-establish connectivity (532). The user 502 may connect back to the virtual desktop (534). The server 305 may load the virtual desktop (536). The client 310 or the server 305 may check whether the user 502 had worked on any files during the connectivity outage (538). The client 310 may synchronize file if user had worked on any files during outage (540). The server 305 may place the file the copy of file in same director with same name as the original file with an indicator (e.g., a suffix) (542). The user 502 may access the files worked on during the connectivity outage (544).

Figure 6A:
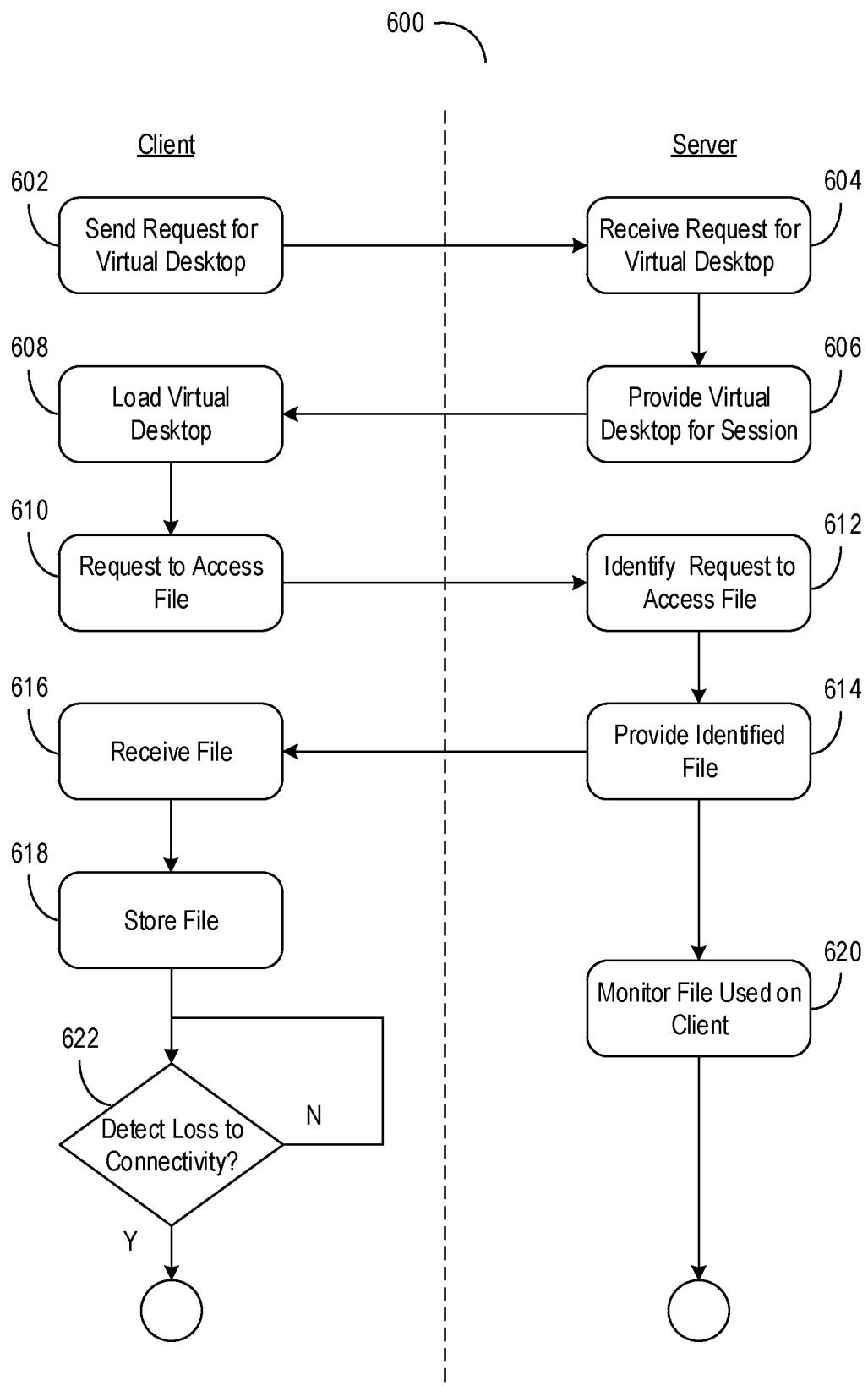
FIGS. 6A-6C are flow diagrams of a method of accessing files from virtual desktops and applications during interruptions in accordance with an illustrative embodiment.
Figure 6B:
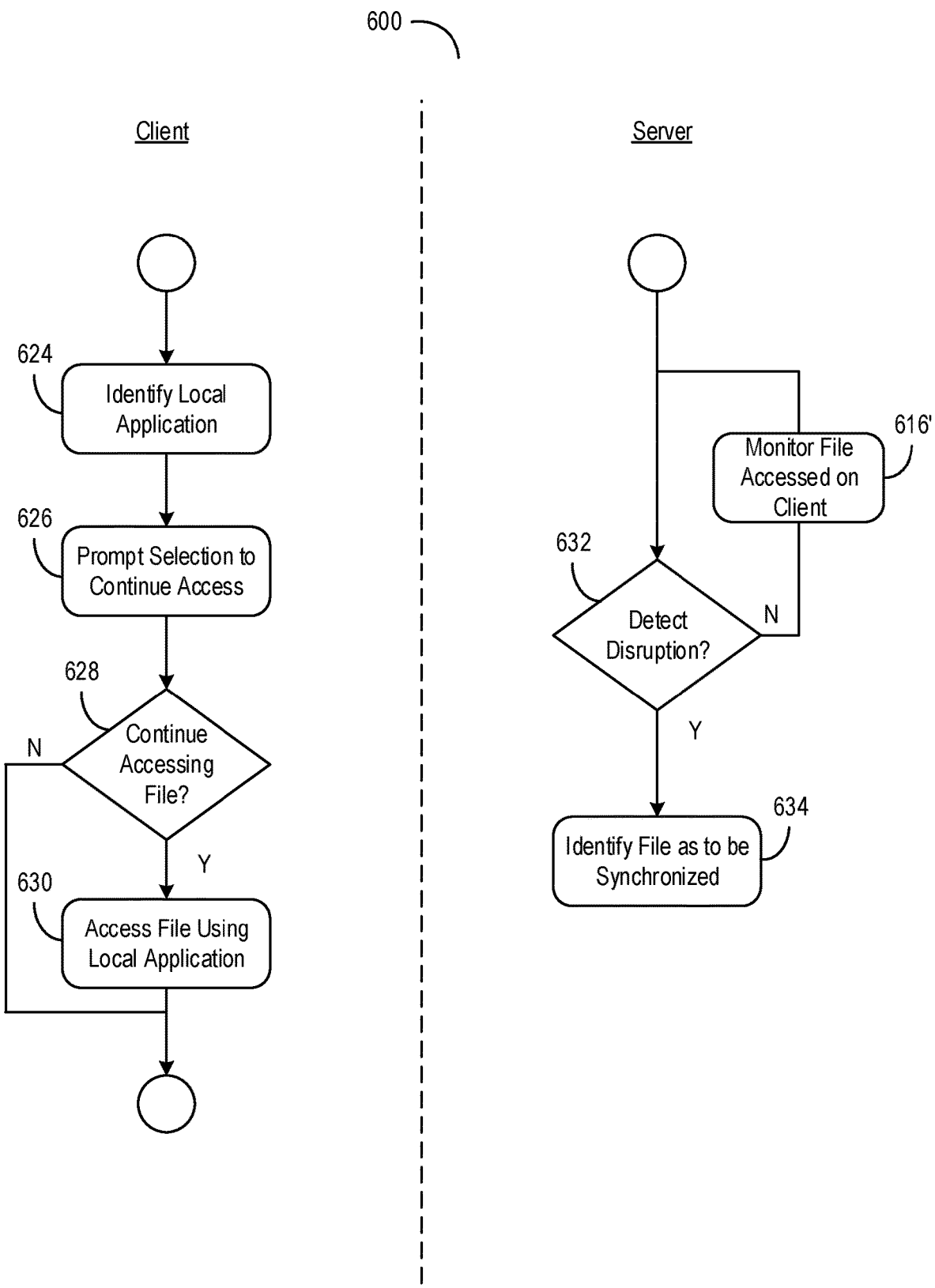
Figure 6C:
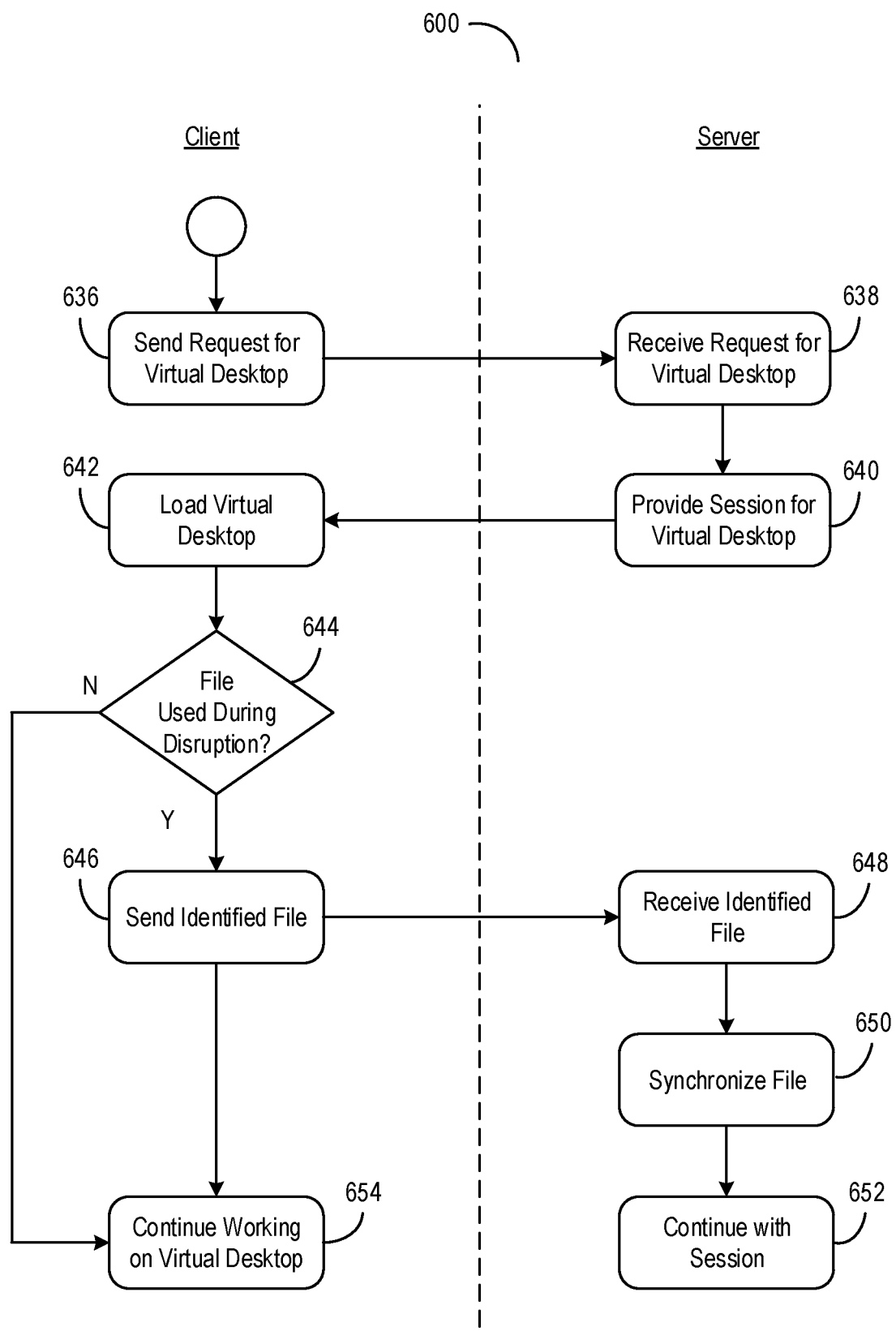

Referring now to FIGS. 6A-6C, depicted are flow diagrams of a method 600 of accessing files from virtual desktops and applications during interruptions. The operations and functionalities of the method 600 may be performed by the components described in FIGS. 1A-4C, such as the server 305 and the client 310 detailed above. Under the method 600, a client (e.g., the client 310) may send a request for a virtual desktop (e.g., the remote desktop 410) to a service (e.g., the server 305) (602). The server may receive the request for virtual desktop from the client (604). The server may provide the virtual desktop for a session (e.g., the session 405) (606). The client may load the virtual desktop (608). The client may request to access a file (e.g., the file 415) (610). The server may identify the request to access the file (612). The server may provide the identified file (614). The client may receive the file (616). The client may store the file (e.g., the file 415' on the local cache 360) (618). The server may monitor the file used on the client (620). The client may monitor for and detect a loss to a connectivity (622).

Upon detection, the client may identify a local application (e.g., the local application 355) (624). The client may prompt selection to continue access (e.g., presenting the prompt 440) (626). The client may determine whether to continue accessing the file (628). If the selection is to continue, the client may access file using the local application (630). In conjunction, the server may detect whether there is a disruption with connectivity (632). If no disruption is detected, the server may continue to monitor the file (e.g., the file 415) accessed on the client (616'). If a disruption is detected, the server may identify the file as to be synchronized (634).

Subsequent to restoration of connectivity, the client may send a request for the virtual desktop to the server (636). The server may receive the request for virtual desktop from the client (638). The server may provide the virtual desktop for a session (e.g., the session 405') (640). The client may load the virtual desktop (e.g., the remote desktop 410') (642). With the establishment, the client may check whether the file was used during disruption (644). If the file is determined as used, the client may send the copy of file to the server (646). The server may receive the copy of file (648). The server may synchronize the file (650). The server may continue the session (652). The client may continue working on the virtual desktop (654).

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus, or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer-readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer-readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
    storing, by a client device, a copy of a file, the copy generated during an active use of the file in which content of the file is accessible by the client device via a remote application hosted on a remote computing device;
    responsive to a loss in connectivity that disrupts the active use of the file by the remote application, identifying, by the client device, a local application on the client device based at least on a type of the file, wherein the file is accessible by the identified local application;
    using, by the client device, the identified local application to access the copy of the file stored on the client device and continue the active use of the content of the file; and
    responsive to re-establishing connectivity with the remote computing device and responsive to determining that the file was accessed during the loss in connectivity, providing, by the client device to the remote computing device, the copy of the file to synchronize with a second copy of the file maintained by the remote computing device;
    wherein storing the copy of the file further comprises encrypting the copy of the file to restrict access to the copy of the file from outside the remote application and the local application; and
    wherein using the identified local application to access the copy of the file stored on the client device comprises decrypting, responsive to the loss in connectivity, the copy of the file.

2. The method of claim 1, further comprising receiving, by the client device and responsive to re-establishing connectivity with the remote computing device, a request to provide the copy of the file accessed at the client device during the loss in connectivity to the remote computing device.

3. The method of claim 1, further comprising maintaining, by the client device and responsive to a rejection of a prompt to continue accessing of the copy of the file using the local application, the file in a cache of the client device.

4. The method of claim 1, wherein using the local application further comprises invoking the local application to access the copy of the file, responsive to a selection of the local application on the client device.

5. The method of claim 1, further comprising establishing, by the client device, a session with the remote computing device to provide a virtual desktop via which the client device is to access the file using the remote application.

6. A method, comprising:
    providing, by a remote computing device, a file to a client device to store a copy of the file during an active use of the file in which content of the file is accessible by the client device via a remote application hosted on the remote computing device;
    identifying, by the remote computing device, a loss in connectivity to the client device, wherein the loss in connecting cause a disruption in the active use of the file via the remote application; and
    receiving, by the remote computing device and responsive to the client device re-establishing the connectivity with the remote computing device subsequent to the disruption, the copy of the file accessed by the client device using a local application, wherein the local application is identified based at least on a type of the file, wherein the copy of the file is used to synchronize with the file maintained by the remote computing device;
    wherein storing the copy of the file further comprises encrypting the copy of the file to restrict access to the copy of the file from outside the remote application and the local application; and
    wherein using the identified local application to access the copy of the file stored on the client device comprises decrypting, responsive to the loss in connectivity, the copy of the file.

7. The method of claim 6, further comprising synchronizing, by the remote computing device, a second copy of the file maintained by the remote computing device with the copy of the file accessed using the local application, subsequent to the disruption.

8. The method of claim 6, wherein providing further comprises storing an encrypted copy of the file to restrict access to the file from outside the remote application and the local application.

9. The method of claim 6, wherein providing further comprises providing a virtual desktop via which the client device is to access the file using the remote application.

10. The method of claim 6, wherein receiving further comprises, responsive to a selection of the local application on the client device identified as configured to access the file, receiving the copy of the file accessed using the local application invoked on the client device.

11. The method of claim 6, wherein receiving further comprises responsive to determining that the copy of the file was accessed at the client device during the disruption, receiving the file from the client device.

12. The method of claim 6, further comprising monitoring, by the remote computing device, active uses of a plurality of files by the client device via the remote application hosted on the remote computing device.

13. A client device, comprising:
one or more processors; and
memory storing instructions that, when executed by the one or more processors, cause the client device to:
store a copy of a file, the copy generated during an active use of the file in which content of the file is accessible by the client device via a remote application hosted on a remote computing device;
responsive to a loss in connectivity that disrupts the active use of the file by the remote application, identify a local application on the client device based at least on a type of the file, the identified local application having access to the file;
use the identified local application to access the copy of the file stored on the client device and continue the active use of content of the file; and
responsive to re-establishing connectivity with the remote computing device and responsive to determining that the file was accessed during the loss in connectivity, provide, to the remote computing device, the copy of the file to synchronize with a second copy of the file maintained by the remote computing device;
wherein the instructions, when executed by the one or more processors, further cause the client device to store the copy of the file by encrypting the copy of the file to restrict access to the copy of the file from outside the remote application and the local application; and
wherein the instructions, when executed by the one or more processors, further cause the client device to use the identified local application to access the copy of the file stored on the client device by decrypting, responsive to the loss in connectivity, the copy of the file.

14. The client device of claim 13, wherein the instructions, when executed by the one or more processors, further cause the client device to determine, responsive to re-establishing connectivity with the remote computing device, a request to provide the copy of the file accessed at the client device during the disruption to the remote computing device.

15. The client device of claim 13, wherein the instructions, when executed by the one or more processors, further cause the client device to maintain, responsive to a rejection of a prompt to continue accessing of the copy of the file using the local application, the file in a cache of the client device.

16. The client device of claim 13, wherein the instructions, when executed by the one or more processors, further cause the client device to invoke, responsive to a selection of the local application on the client device, the local application to access the file.

\* \* \* \* \*